US007014223B2

(12) United States Patent
Della Pina et al.

(10) Patent No.: US 7,014,223 B2
(45) Date of Patent: Mar. 21, 2006

(54) SCREW THREADED JOINT FOR CONTINUOUS-PROFILE TUBES

(75) Inventors: Giuseppe Della Pina, Treviolo (IT); Giuseppe Rotini, Dalmine (IT); Angelo Signorelli, Chiuduno (IT)

(73) Assignee: Dalmine S.p.A. (Italian Joint Stock Company), Dalmine (IT)

( * ) Notice: Subject to any disclaimer, the term of this patent is extended or adjusted under 35 U.S.C. 154(b) by 0 days.

(21) Appl. No.: 10/344,187

(22) PCT Filed: Aug. 8, 2001

(86) PCT No.: PCT/EP01/09169

§ 371 (c)(1), (2), (4) Date: Jun. 19, 2003

(87) PCT Pub. No.: WO02/12769

PCT Pub. Date: Feb. 14, 2002

(65) Prior Publication Data

US 2004/0036286 A1 Feb. 26, 2004

(30) Foreign Application Priority Data

Aug. 9, 2000 (IT) .......................... MI2000A1864

(51) Int. Cl.
*F16L 15/00* (2006.01)

(52) U.S. Cl. ....................... 285/333; 285/334; 285/390

(58) Field of Classification Search ................ 285/333, 285/334, 355, 390

See application file for complete search history.

(56) References Cited

U.S. PATENT DOCUMENTS

| | | | | |
|---|---|---|---|---|
| 3,856,337 | A * | 12/1974 | Ehm et al. | 285/334 |
| 3,870,351 | A | 3/1975 | Matsuki | |
| 4,153,283 | A | 5/1979 | Hellmund et al. | |
| 4,384,737 | A * | 5/1983 | Reusser | 285/334 |
| 4,501,443 | A * | 2/1985 | Haring | 285/328 |
| 4,611,838 | A * | 9/1986 | Heilmann et al. | 285/331 |
| 4,623,173 | A * | 11/1986 | Handa et al. | 285/333 |
| 4,629,221 | A * | 12/1986 | Lumsden et al. | 285/238 |
| 4,736,967 | A * | 4/1988 | Mott et al. | 285/94 |
| 4,958,862 | A * | 9/1990 | Cappelli et al. | 285/334 |
| 4,984,829 | A * | 1/1991 | Saigo et al. | 285/334 |
| 5,338,074 | A * | 8/1994 | Barringer et al. | 285/334 |
| 5,649,725 | A * | 7/1997 | Nagasaku et al. | 285/334 |
| 6,045,165 | A * | 4/2000 | Sugino et al. | 285/333 |
| 6,237,967 | B1 * | 5/2001 | Yamamoto et al. | 285/333 |
| 6,332,110 | B1 * | 12/2001 | Wolfe | 702/22 |

FOREIGN PATENT DOCUMENTS

| | | |
|---|---|---|
| EP | 0916883 | 5/1999 |
| FR | 2281488 | 3/1976 |

* cited by examiner

*Primary Examiner*—James M. Hewitt

(57) ABSTRACT

A flush-type integral threaded joint with truncated-cone threads, with two scaling surfaces 11', 12', 11", 12") set at the end of the threaded portions (7, 8), and with two annular scaling shoulders (5', 6', 5", 6"). The two threaded portions (7, 8) of the male element (1) and female element (2), respectively, have the same value of conicity, and the two sealing surfaces (11', 12', 11", 12") are, in one case, conical or cylindrical, and in the other spherical. The threaded portion of each male and female element may have an end area with a thread that is not perfect.

21 Claims, 1 Drawing Sheet

SCREW THREADED JOINT FOR CONTINUOUS-PROFILE TUBES

FIELD OF INVENTION

The present invention relates to an integral threaded joint with zero diametral encumbrance for tubes, in particular for tubes used in the natural-gas and oil extraction industry. The said tubes may be used both as tubing for pumping gas, oil or liquefiable hydrocarbons, and as casings for the bore-holes.

STATE OF THE ART

In the natural-gas and oil extraction industry, when drilling oil or gas wells, tubings or casings having a pre-defined length are used, which must be joined together at their ends to form strings, in order to be able to reach the very large depths at which reservoirs of oil, gas, and liquefiable hydrocarbons are located.

The most commonly used drilling technique is that of drilling wells that start from the surface of the ground or of the sea until the oil field or gas reservoir is reached. The depth of these shafts can attain several thousands of metres. During drilling, the boreholes are lined with metal casings throughout their length. The segments of metal casing, which are each some ten metres long, are joined together by means of threaded joints. These casings then form a tubular string having a constant diameter throughout its length, except at the joints, where the external diameter is generally at least 1 inch (25.4 mm) greater than that of the string itself. In order to line the borehole throughout its depth, a number of strings are used, which have, for reasons of mechanical resistance and the geological characteristics of the formation, decreasing diameters the greater the depth reached by the string, so as to constitute a telescopic structure. It follows that, since the diameter at the bottom of the shaft is fixed according to the pressure and flow rate of the fluid that is to be extracted, the deeper the well, the larger its diameter at the surface. A disadvantageous consequence of this is that the cost of drilling is high, and the amount of material required for these coatings is also high, with consequent high costs. A smaller diameter of the well also enables a reduction in drilling times and times for completion of the well. Consequently, it is important to reduce the diameter of shafts to the minimum, and hence also the diameter of the tubes used to make the casings, given the same amount of fluid to be extracted.

Once the drilling operations are completed, into the wall of the borehole thus lined there is inserted a tubing, which has the function of pumping the gas, oil or liquefiable hydrocarbon out of the underground reservoir. This tubing, which is sunk to the entire depth of the well, and which can thus reach lengths of several thousand metres, is also formed by joining tubes each of some ten metres in length by means of joints of the type referred to above. Normally, also this tubing has a constant diameter throughout its length, except at the joints, where the external diameter is generally larger, as in the previous case.

In both of the cases referred to above, the tubes are joined together by threaded joints, which may be of the integral type, in which case one end of the tube has a male thread and the other end a female thread, or else of the muffed type, in which case both ends of the tube have a male thread and are joined together by a threaded sleeve or muff having female threads at both ends. Normally, the presence of the joint involves an increase in the external diameter of the line at the joint, and this results in an increase in the overall dimensions of the line and of the bore, which are the greater the greater is the external diameter of the joint with respect to the tube.

In view of the demand from the oil companies to reduce to a minimum the costs for extraction of oil, gas and liquefiable hydrocarbons, considerable efforts have been made to reduce the diameter of the wells, and consequently the diameter of the tubes used.

In order to limit the external diameter of the tubing, and consequently the costs for drilling and for the material installed, threaded joints having small diametral dimensions are used. These can be divided into three types according to the features required and the maximum overall dimensions allowed. A first type, which is frequently referred to as "semi-flush", is a joint of the muffed type, the external diameter of which exceeds the external diameter of the tube by not more than 6%. A second type, generally referred to as "near-flush", is a joint of an integral type, the external diameter of which exceeds that of the tube by 2–3%. Finally, a third type, referred to as "flush", is an integral joint, the external diameter of which is equal to the external diameter of the tube.

The choice between the various types of joint is made according to the load that the string has to withstand, the pressure that acts inside and/or outside the string, the length of the string, and the maximum diametral dimensions allowable in relation to the diametral dimension of the shaft.

If the diameter of the joints is reduced, it is necessary to find solutions for compensating their reduced structural strength. In fact, in the region of the joints the efficiency of the tube is necessarily lower than in the body of the tube since the constructional elements, such as the thread, the seals, and the shoulders, are obtained in the thickness of the wall of the tube, and this in turn leads to a reduction in the net section in critical areas of the male thread and female thread. Reducing to a minimum the causes of failure of joints is of fundamental importance because the failure of the tubes, above all after they have been set in operation underground, and hence in a situation where it is practically impossible for operators to intervene directly on the joint in the event of a failure in the latter, may have extremely serious economic consequences for the extraction plant and may cause considerable damage to the environment, particularly in the case where the oil or gas reservoir contain aggressive elements.

For this reason, in the past much effort has been directed towards improving the joints and bringing them up to an optimal level of efficiency, endeavouring to achieve a proper balance between the various requirements, which are, at times, conflicting, of minimal overall dimensions, maximum structural strength, and tightness to prevent fluids coming out of or entering the well. The tubes are, in fact, subjected to compressive, tensile and bending loads and to the pressure produced by fluids acting from outside and/or circulating inside the tubes themselves.

The joints must also possess excellent characteristics of resistance to screwing and seizing.

The structural problems and the problems of tightness are frequently aggravated by the temperature of the fluids, their capacity for causing corrosion, and the environmental conditions existing in the areas of extraction.

In the past, various solutions have been proposed for joints aimed at meeting the demands referred to above.

The U.S. Pat. No. 5,462,315 describes an embodiment of a joint having reduced diametral dimensions, which in one variant of the invention may even be zero. The joint has a central shoulder, which bears, both on the male side and on the female side, a projection and a slot parallel to the axis of the tube, with homologous surfaces and such as to mate perfectly with a blocking function for the two members of the joint. Present on the projections of the shoulder are two sealing surfaces. The shoulder separates two portions of thread, of a conical or conical-cylindrical shape, radially staggered with respect to one another.

This joint is very efficient, but has a structure that is particularly complex to make and that involves high production costs.

The U.S. Pat. No. 5,427,418 describes a joint with zero diametral encumbrance, with a conical thread and a tooth profile with a large angle of the load flank. Tightness is ensured by the grease trapped in the thread.

This joint can achieve high values of efficiency, but does not have a shoulder designed to protect the joint from possible excess screwing torque, and hence from excessive stresses that would impair its functionality, and it is not provided with a metal seal.

SUMMARY OF THE INVENTION

A primary purpose of the present invention is consequently that of overcoming the drawbacks referred to above, which are presented by the known joints for tubes, by providing a new flush-type integral joint which, albeit having a practically zero diametral encumbrance as other joints of the prior art, does not present the disadvantages mentioned previously.

A particular purpose of the present invention is to provide an integral joint with a diametral dimension not greater than the diametral dimension of the tube throughout its length, which has a reduced production cost, at the same time guaranteeing high values of strength and tightness in situ.

A further purpose of the present invention is to provide a shape that facilitates installation.

The above purposes are achieved by a threaded integral joint for tubes, which comprises a male member provided, on its outer surface, with a portion of thread having the shape of a truncated cone, and a female element provided on its inner surface with a portion of thread having the shape of a truncated cone, each of said male and female elements being provided with two sealing surfaces set at opposite axial ends with respect to said respective threaded portions, and with functions, in the first case, of external seal, and in the second case, of internal seal, and with two shoulders having an annular shape, substantially lying in a plane orthogonal to the axis of said male and female members, said respective two threaded portions being designed to be screwed together reversibly, one inside the other, until contact between said two annular shoulders is achieved, said joint being characterized in that said respective two threaded portions of each male and female element have the same value of conicity, and in that said respective two sealing surfaces of said male and female elements are one of a conical or cylindrical shape, and the other of a spherical shape.

Thanks to this embodiment, the joint enables facilitated installation of the tubular string, with reduced risks of seizing of the thread and of the seal, at the same time guaranteeing an optimal strength and tightness of the string at the joints.

In a preferred embodiment of the invention, in the internal seal one of the two surfaces has a conical shape, and the other a spherical shape, whilst in the external seal one of the two surfaces has a conical or cylindrical shape, and the other has a spherical shape.

Other preferred embodiments of the invention are described in detail in the dependent claims.

BRIEF DESCRIPTION OF THE FIGURES

Further characteristics and advantages of the present invention will emerge more clearly from the ensuing detailed description of a preferred, but non-exclusive, embodiment of an integral joint of the flush type, illustrated purely by way of non-limiting example with the aid of the attached plate of drawings, in which.

DETAILED DESCRIPTION OF PREFERRED EMBODIMENTS OF THE INVENTION

Figure 1:
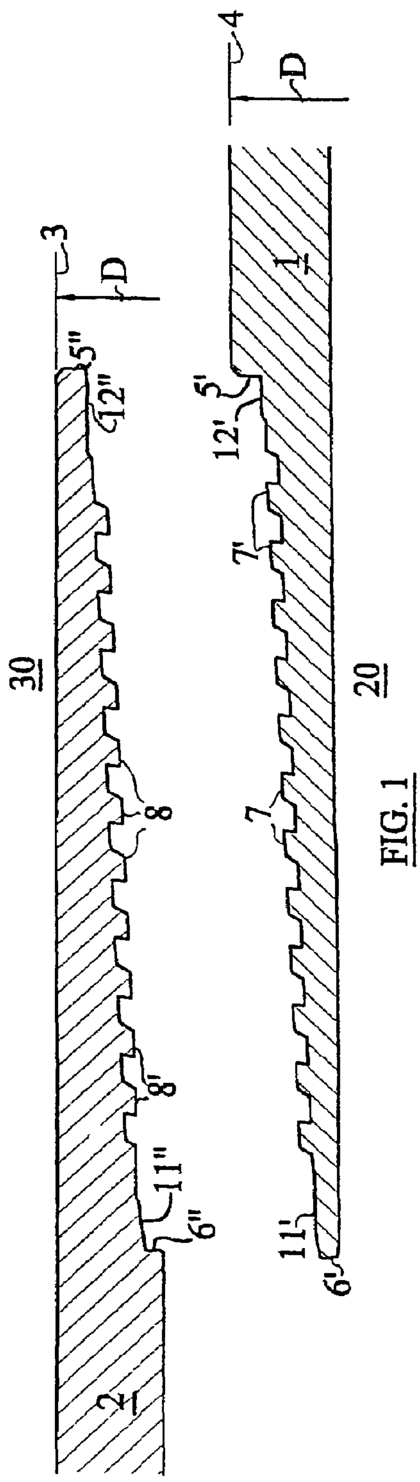
FIG. 1 represents a sectional view in a plane that passes through the longitudinal axis of the joint in conformance with the invention, with the two members in a separate position.
Figure 2:
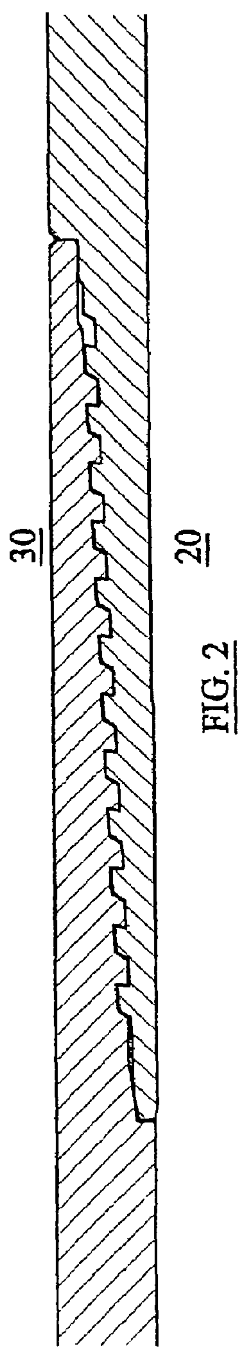
FIG. 2 represents the joint of FIG. 1 with the members in a joined position.

With reference to the above figures, the joint according to the invention comprises two members, or segments of tube, namely, the male part 1 and the female part 2. The joint defines an internal part 20, in which the fluid flows, for example natural gas or oil or other similar fluid, and an external part 30, which may also be filled with gases or liquids of various nature, which are also generally under pressure. The external diameter 3 of dimension D of the tube 2 in the region of the joint is equal to the external diameter of the tube itself in the part distant from the joint, minus the tolerances of fabrication of the tube. Also the tube 1, which has a male thread, has an external diameter 4 of a constant dimension D throughout its length, except for the threaded region itself.

The female member 2 of the joint has an internal thread 8 with a conical generatrix. The thread has a conicity with values of between 6.25% and 12.5%. The range indicated above is optimal because, on the one hand, the choice of lower values would entail making threads that are excessively long, with the consequence that it becomes difficult to get the male part to enter the female part, and, on the other hand, the choice of higher values would mean that too few teeth are available in the threaded portion, and hence the thread has an insufficient bearing capacity. In an advantageous variant of the invention, the thread may be perfect throughout its length. At the end of the thread 8 in the inside of the tube 2, this has an annular shoulder 6" set in a plane orthogonal to the axis of the tube.

The female member 2, in the region of connection between the shoulder 6" and the threaded portion 8, has an annular region 11" with a conical surface. The conicity of this surface is between 12.5% and 25% in order to guarantee a good seal with the reciprocal contact surface of the male element 1. The range of values proposed proves optimal in relation to the value of the conicity adopted for the thread and such as to limit the negative effect of the tensile loads on the effectiveness of the aforesaid seal.

At the external end of the thread 8 the tube 2 is provided with a spherical surface 12", which, after screwing with the male member 1, comes into contact with the conical region 12' of the latter.

Figure 3:
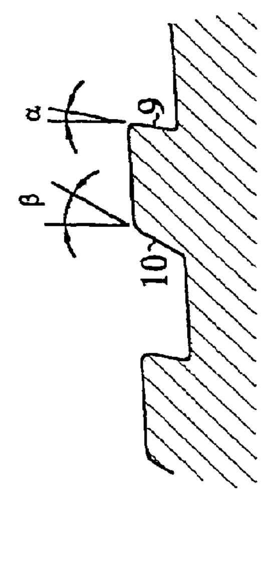
FIG. 3 represents an enlargement of a detail of the thread of the joint illustrated in FIG. 1.

With particular reference to FIG. 3, the profile of the tooth of the thread is of the "hooked" type, with the load flank 9 at a negative angle • with values of between 0° and −10° and with the lead-in flank 10 with a positive angle • of between 20° and 45°. These ranges of values afford considerable advantages, whilst, at the same time, maintaining ease of fabrication of the joint. A load flank with a negative angle enables an effective fit of the two members of the joint and reduces the possibility of opening of the joint on account of high tensile loads. A lead-in flank with an angle that is positive but not large enables effective participation of the thread in the resistance to compressive loads.

The male member 1 has, in the area of the outer surface which faces the threaded region of the female member, a thread 7 set in a perfectly reciprocal way, with portions shaped in a perfectly analogous manner.

The connection region 12' between the external shoulder 5' and the start of the threaded portion 7 has a conical surface with values of conicity of between 0% and 25%. This surface presses against the spherical surface 12" of the female member after screwing of the joint, and the dimensions and tolerances are chosen in such a way that the metal-metal contact guarantees a tightness that will prevent any liquid or gas under pressure that may be outside the joint from penetrating.

The male member 1 has a surface 11' of a spherical shape at its end, which, after screwing with the female member 2, comes to press against the conical surface 11" of the female part. Also in this second region, there is produced a metal-metal contact pressure between the two members 1 and 2, which creates a seal against the pressure of the fluid present inside the tube.

The choice of the two regions 11', 11" and 12', 12" at the ends of the joint where the metal seals are produced with facing surfaces having a spherical and conical shape or a spherical and cylindrical shape, in accordance with the invention, renders the joint less sensitive to the pressure loads that act on it, and have proved optimal for thin tubing. In fact, given the slenderness of the ends on which the sealing surfaces 11' and 12" are made, the pressure, respectively inside and outside the tube, acting on the aforesaid ends, is very likely to cause their deflection. Consequently, a spherical sealing surface is able to maintain even so an optimal contact, as compared to a seal of the truncated-cone type, which in this case, on account of the rotation imposed by the deflection of the end, fails to maintain the contact over the entire sealing band.

At the end of the thread 7 set in the outer part of the tube 1, the tube 1 has an annular shoulder 5' set in a plane orthogonal to the axis of the tube. After screwing of the male and female members together, the shoulder 6" of the female member 2 comes to rest against the end face 6' of the male member 1, and the shoulder 5' of the male member 1 comes to rest against the end face 5" of the female member 2. The fabrication of the joint and the manufacturing tolerances are such that the inner shoulder never comes into contact before the outer one, which is intrinsically more robust, so as not to cause excessive screwing stresses. The double shoulder moreover protects the joint from possible excessive torsional loads ("overtorque"), which may occur both on account of faulty manoeuvres when screwing, and, above all, in particular operations during installation in the well. Such loads could lead to excessive stresses on the joint and impair their functionality.

The shape of the teeth of the thread of the male member 1 is the same as that of the thread of the female member 2, referred to above. Advantageously, the thread has a perfect profile throughout the length of the threaded portion.

In a variant according to the invention, it may be envisaged that the end region 7' of the threaded portion 7 of the male element, in the proximity of the annular sealing surface 12', has a thread with a non-perfect profile. The corresponding region 8 of the female element on the side 12", which is set facing the portion 7', has a perfect thread. The region 8' at the opposite end of the threaded portion 8, i.e., the region in the vicinity of the sealing surface 11", may also itself have a thread with a non-perfect profile, and the corresponding threaded portion 7 of the male member facing it has a perfect thread.

From what has been said above, the advantages of the joint according to the invention are evident, in that it ensures optimal operating performance and efficiency.

What is claimed is:

1. A flush-type integral threaded joint for tubes, comprising a male member (1) provided, on its outer surface, with a frustoconical threaded portion (7) and a female member (2) provided on its inner surface with a frustoconical threaded portion (8), said respective two frustoconical threaded portions (7, 8) of said male (1) and female (2) members having the same value of conicity, comprising between 6.25% and 12.5%, and being designed to screw together in a reversible way, one inside the other, until contact is produced between two pairs of annular shoulders (5', 6', 5", 6") lying substantially in a plane orthogonal to the longitudinal axis of said male and female members (1, 2), each of said male (1) and female (2) members being provided with a pair of sealing surfaces (11', 12'; 11", 12") respectively set adjacent each end of said respective frustoconical threaded portions (7, 8) and with functions, in the first case, as an external seal (12', 12") and in the second case as an internal seal (11', 11") wherein a first surface of each of the two pairs of sealing surfaces (11', 12'; 11", 12") is of a spherical shape and wherein each pair of sealing surfaces (11', 12'; 11", 12") is adapted to operate under reciprocal radial interference of the correspondent sealing surfaces to provide a flush-type threaded joint.

2. The joint according to claim 1, wherein in the internal seal the second surface (11") of the pair of sealing surfaces is conical and in the external seal the second surface of the pair of sealing surfaces (12') is cylindrical.

3. The joint according to claim 2, wherein the conical sealing surface (11") has a conicity of between 12.5% and 25%.

4. The joint according to claim 3, wherein the profile of a tooth of a thread has a load flank (9) with a negative angle (a), and a lead-in flank (10) with a positive angle (β).

5. The joint according to claim 4, wherein said negative angle (a) has a value of between 0° and −10°, and said positive angle (β) has a value of between 20° and 45°.

6. The joint according to claim 5, wherein said threaded portions (7, 8) of both the male member (1) and the female member (2) have a perfect thread throughout their length.

7. The joint according to claim 5, wherein the threaded portion (7, 8) of at least one of the male member (1) and the female member (2) has a region (7', 8') with a non-perfect thread at a first end thereof.

8. The joint according to claim 7, wherein the threaded portion (7, 8) of the other of said male member (1) and female member (2) also has a region (7', 8') with a non-perfect thread at the end axially opposite to said first end.

9. The joint according to claim 1, wherein in both the internal and external seals the respective second surface of the pair of sealing surfaces (12', 11") is cylindrical.

10. The joint according to claim 9, wherein the profile of a tooth of a thread has a load flank (9) with a negative angle (a), and a lead-in flank (10) with a positive angle (β).

11. The joint according to claim 10, wherein said negative angle (a) has a value of between 0° and −10°, and said positive angle (β) has a value of between 20° and 45°.

12. The joint according to claim 11, wherein said threaded portions (7, 8) of both the male member and the female member have a perfect thread throughout their length.

13. The joint according to claim 11, wherein said threaded portions (7, 8) of at least one of the male member (1) and the female member (2) has a region with a non-perfect thread at a first end.

14. The joint according to claim 13, wherein the threaded portion (7, 8) of the other of said male member (1) and female member (2) also has a region (7', 8') with a non-perfect thread at an end axially opposite to said first end.

15. The joint according to claim 1, wherein in both the internal and external seals the respective second surface of the pair of sealing surfaces (12', 11") is conical.

16. The joint according to claim 15, wherein the conical sealing surfaces (12', 11") have a conicity of between 12.5% and 25%.

17. The joint according to claim 16, wherein the profile of a tooth of a thread has a load flank (9) with a negative angle (a), and a lead-in flank (10) with a positive angle (β).

18. The joint according to claim 17, wherein said negative angle (a) has a value of between 0° and −10°, and said positive angle (β) has a value of between 20° and 45°.

19. The joint according to claim 18, wherein said threaded portions (7, 8) of both the male member and the female member have a perfect thread throughout their length.

20. The joint according to claim 18, wherein said threaded portions (7, 8) of at least one of the male member (1) and the female member (2) has a region with a non-perfect thread at a first end.

21. The joint according to claim 20, wherein the threaded portion (7, 8) of the other of said male member (1) and female member (2) also has a region (7', 8') with a non-perfect thread at the end axially opposite to said first end.

* * * * *